United States Patent [19]
Mathieu

[11] Patent Number: 5,188,145
[45] Date of Patent: Feb. 23, 1993

[54] VALVE

[75] Inventor: Luc Mathieu, Annecy le Vieux, France

[73] Assignee: Alcatel Cit, Paris, France

[21] Appl. No.: 824,342

[22] Filed: Jan. 23, 1992

[30] Foreign Application Priority Data

Jan. 25, 1991 [FR] France .................. 91 00877

[51] Int. Cl.$^5$ ............................................. F16K 49/00
[52] U.S. Cl. ..................................... 137/340; 137/468; 251/204
[58] Field of Search ....................... 137/340, 334, 468; 251/204, 203

[56] References Cited

U.S. PATENT DOCUMENTS

| | | | |
|---|---|---|---|
| 891,062 | 6/1908 | Hansen | 137/468 |
| 2,752,758 | 7/1956 | Tann | 137/340 |
| 2,832,204 | 4/1958 | Pilling | 137/340 |
| 3,524,467 | 8/1970 | Worley | 137/340 |
| 4,195,655 | 2/1980 | Augsburger et al. | 137/340 |

FOREIGN PATENT DOCUMENTS

| | | | |
|---|---|---|---|
| 361654 | 10/1922 | Fed. Rep. of Germany. | |
| 2540528 | 3/1977 | Fed. Rep. of Germany | 251/204 |
| 2026629 | 6/1977 | Fed. Rep. of Germany. | |
| 1461355 | 11/1966 | France. | |
| 15698 | 10/1927 | Netherlands | 251/204 |
| 1047610 | 11/1966 | United Kingdom. | |

Primary Examiner—A. Michael Chambers
Attorney, Agent, or Firm—Sughrue, Mion, Zinn, Macpeak & Seas

[57] ABSTRACT

A valve comprising a valve body (1) provided with two openings (2, 3) each fitted with a flange (4, 5) for connection to pipework, and a moving valve member (6) for closing one of the two openings (3), said opening including a valve seat (26) whose profile corresponds to that of the valve member, said valve member (6) including means (14, 8, 9, 24) for displacing it towards its seat, the valve being characterized by the fact that said valve member (6) or its seat (26) is made of a shape memory alloy treated in such a manner that the shape memory effect is reversible, said piece (6, 26) made of shape memory alloy including channels (27, 31) enabling it to be fed with fluids for changing its state, thereby causing the said piece (6, 26) made of shape memory alloy to expand or contract as appropriate.

4 Claims, 4 Drawing Sheets

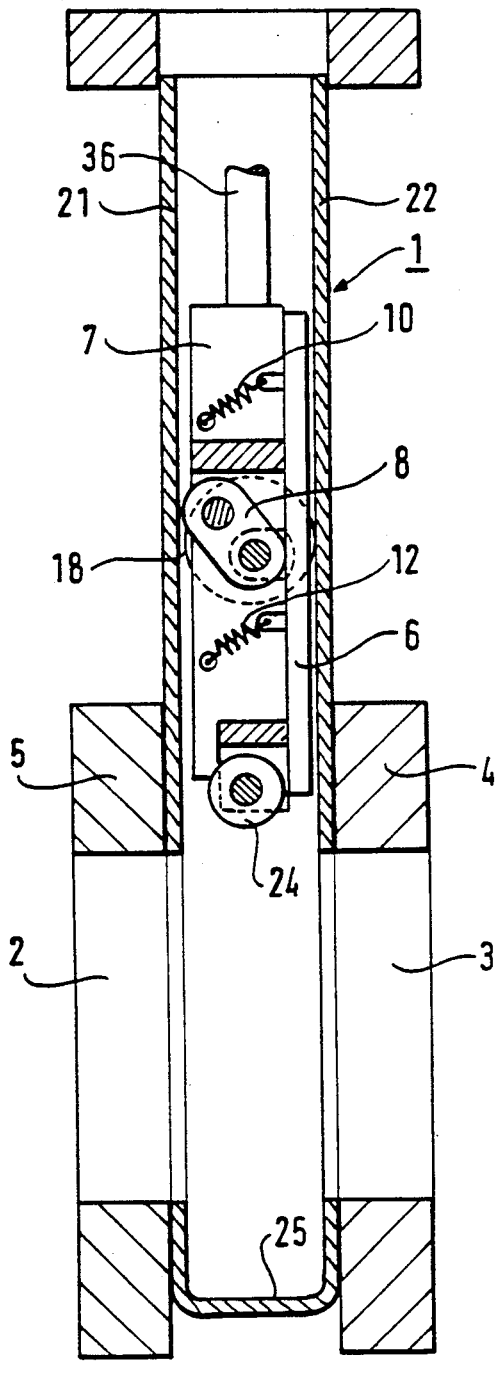
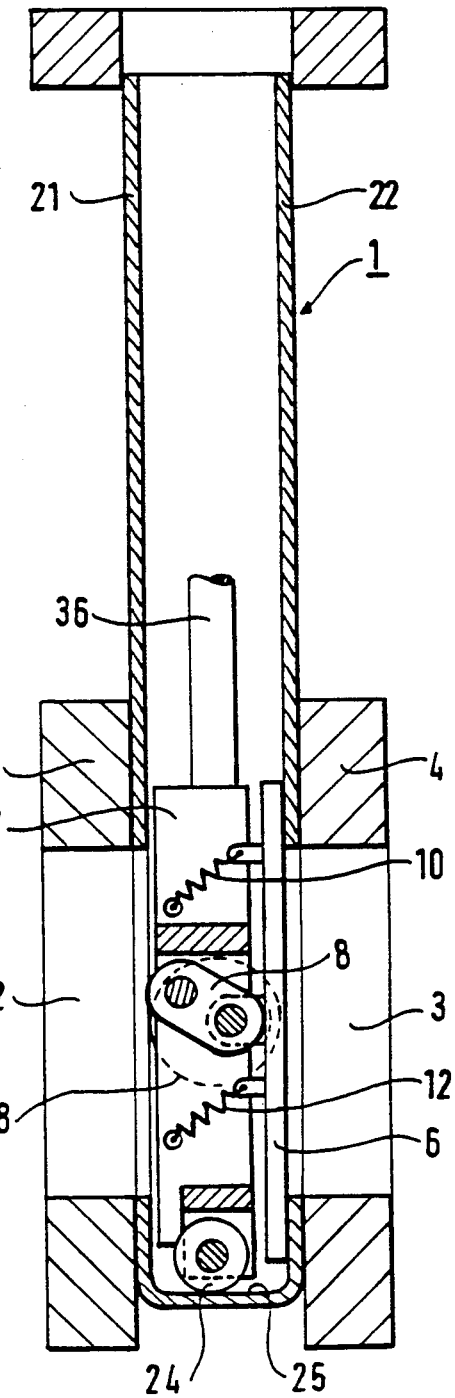

FIG.7
FIG.8
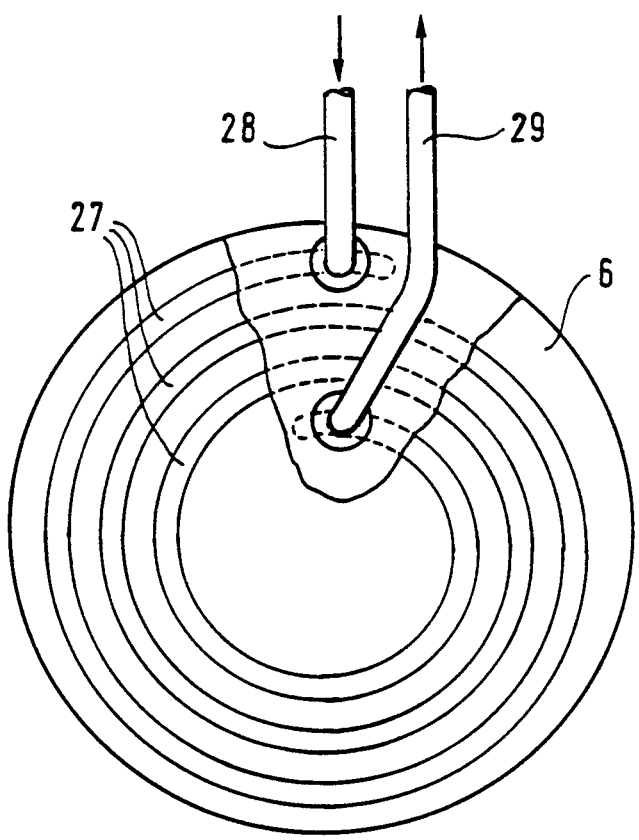
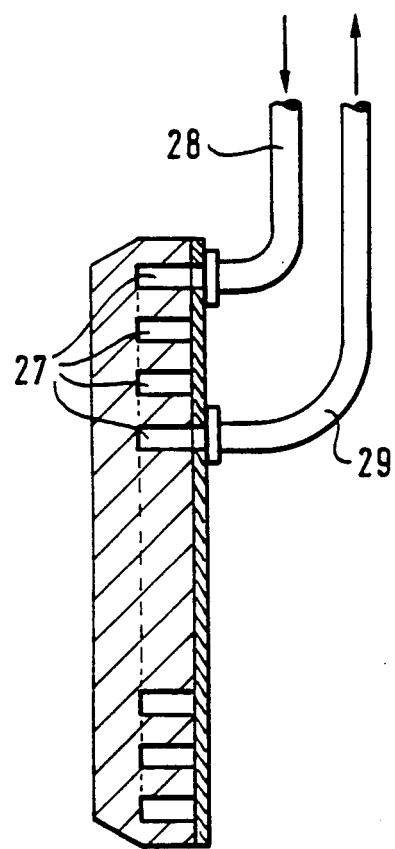

VALVE

In numerous applications in the field of vacuums, there is a need for a sealing system that does not use an elastomer gasket. This applies, for example, to ultrahigh vacuum where elastomers are prohibited both because of the degassing that they give rise to and because they limit the possibility of high temperature baking given their constitution. The same applies to the nuclear field where radiation damages elastomer gaskets very quickly.

To avoid such gaskets, systems are known where sealing is achieved by metal on metal. In particular, French patent document 2 470 315 describes a system in which a metal ring is wedged between a fixed cone forming a valve seat and a moving cone fixed to said valve member.

Such a device, and indeed most sealing systems relying entirely on metal, requires a large force to ensure proper sealing, which limits application thereof to medium diameters.

An object of the present invention is to provide a valve which does not require large mechanical force, which has a long lifetime, which is applicable to any diameter, and whose ability to maintain sealing over time does not require a source of energy to be used.

The present invention thus provides a valve comprising a valve body provided with two openings each fitted with a flange for connection to pipework, and a moving valve member for closing one of the two openings, said opening including a valve seat whose profile corresponds to that of the valve member, said valve member including means for displacing it towards its seat, the valve being characterized by the fact that said valve member or its seat is made of a shape memory metal alloy treated in such a manner that the shape memory effect is reversible, said piece made of shape memory metal alloy including channels enabling it to be fed with fluids for changing its state upon heating and cooling, thereby causing the said piece made of shape memory alloy to expand or contract as appropriate.

French patent number 1 461 355 describes a valve in which the valve seat comprises a ring that is fitted with electrical resistances. These resistances serve to heat the ring in such a manner as to expand it so as to cause its radius $R$ to increase to a value $R + \delta R$. The valve member itself whose radius at ambient temperature is equal to $R + \frac{1}{2}\delta R$ is then placed on its seat, after which the electricity feed to the heating resistances on the ring is interrupted.

The phenomenon used therein is expansion due to heating, which phenomenon is quite different from the change of state phenomenon exhibited by shape memory alloys. With a shape memory alloy, the deformation is much greater, and in addition, in the invention, only one of the two pieces, the seat or the valve member, is made of a shape memory alloy.

Thus, at the moment when the valve is opened, i.e. when the two pieces are in intimate contact before coming apart, and where temperature exchanges therefore take place easily between the two pieces, only the piece made of shape memory alloy returns to its initial dimensions while the other piece is subject to a minimal change of dimension only.

In the case of the document mentioned above, and in spite of a thermal barrier that is possible but difficult to achieve in practice between the two pieces, there is a risk of jamming, particularly if surface adhesion has occurred due to the valve being in the closed position for a long period of time.

An embodiment of the invention is described below with reference to the accompanying drawings, in which:

FIG. 2 is a side view of the FIG. 1 valve in the open position;

FIG. 3 is a side view of the FIG. 1 valve in the closed position;

FIGS. 7 and 8 show the valve with its internal fluid flow circuit for providing the changes of state.

Figure 1:
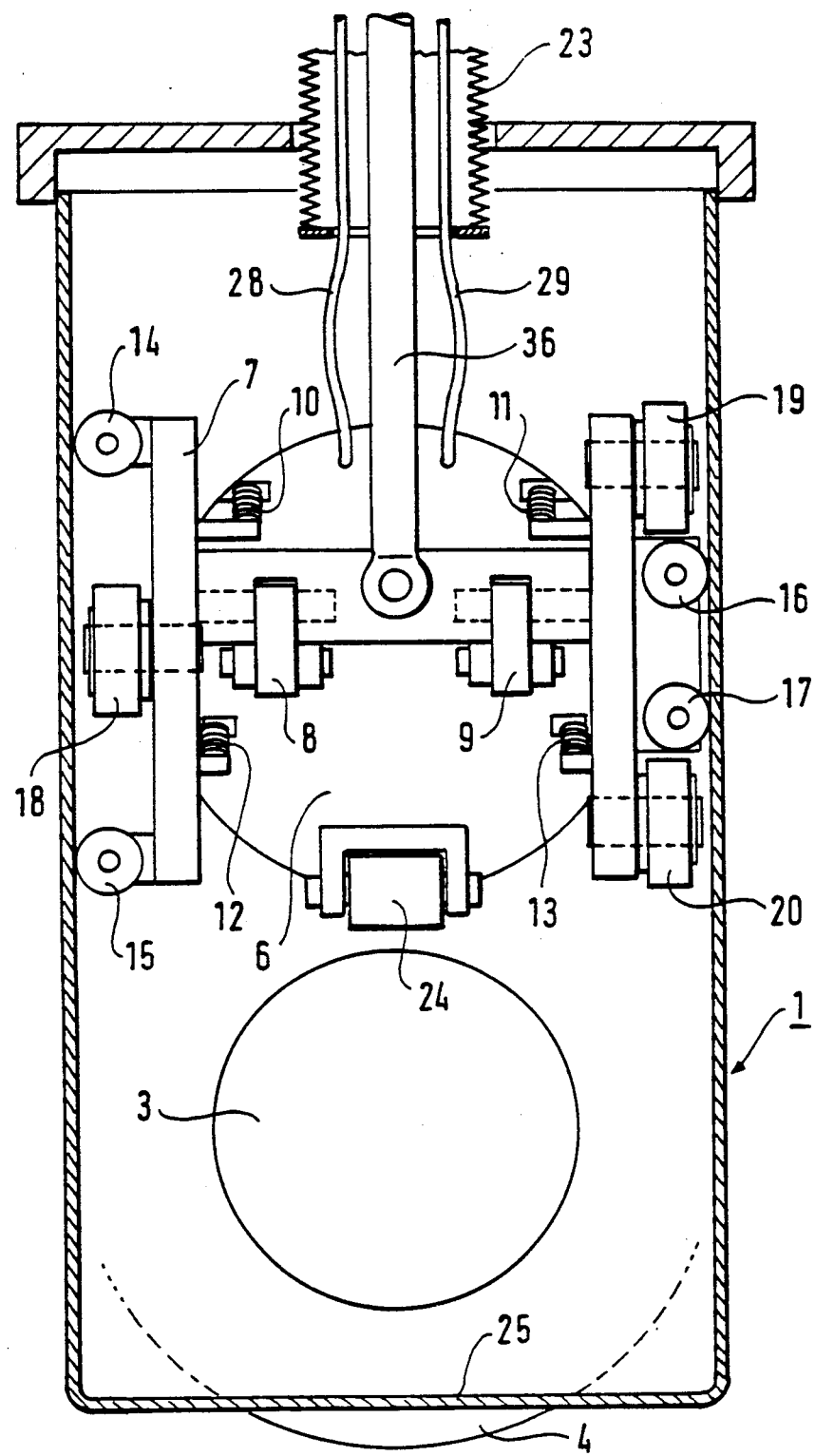
FIG. 1 shows a valve of the invention.

With reference to FIGS. 1, 2, and 3, there can be seen a valve comprising a valve body 1 fitted with two openings 2 and 3 having flanges 4 and 5 for connecting the valve to pipework. The valve includes a closure valve member suspended from a carriage 7 by two links 8 and 9 and by four return springs 10 to 13. The purpose of the carriage 7 is to move the valve member 6 for opening or closing the valve. The carriage 7 is linked to a control rod 36. The carriage 7 is guided laterally by four guide wheels 14 to 17 and in another lateral direction by three guide wheels only 18, 19, and 20 of large diameter that is slightly less than the distance between the two walls 21 and 22 (FIGS. 2 and 3) of the body 1, such that these wheels run either on the wall 21, or else on the wall 22. When the valve is closed (FIG. 3) and the valve member is pressed against its seat, thereby closing the opening 3, these three wheels are all pressed against the wall 21.

In FIGS. 2 and 3, the drive rod 36 is shown. The movement of this rod is entirely conventional. A sealing bellows 23 provides sealing of the valve body in a manner that is likewise very conventional.

When the valve member moves downwards to close the valve, it follows its stroke until one of the wheels (24) connected to the valve member 6 comes into abutment against the bottom 25 of the valve body 1. Once the valve member is this position, the carriage 7 can still move down a little because of the links 8 and 9, thereby causing the valve member 6 to move axially running on the wheel 24 until it bears against the valve seat. On opening, when the carriage 7 is raised, the return springs 10 to 13 return the valve member 6 automatically towards the carriage 7.

According to the invention, the valve member 6 or the seat therefor is made of a shape memory alloy which is treated in such a manner that the memory effect is reversible both when going from the austenitic phase to the martensitic phase on cooling, and when going from the martensitic phase to the austenitic phase on heating.

Figure 4:
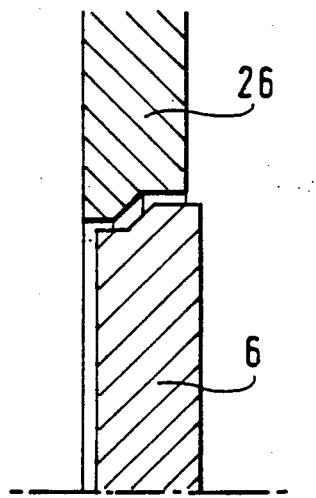
FIGS. 4 and 5 show two examples of possible sections for the valve member and for its seat.
Figure 5:
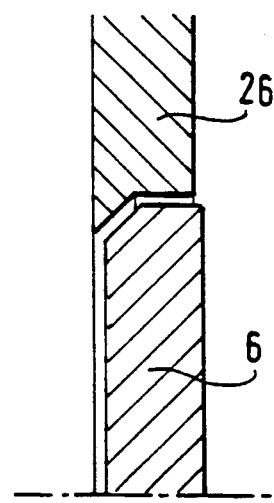

FIGS. 4 and 5 show two examples of suitable sections for the valve member 6 and its seat 26.

In FIGS. 1 to 3, the seat 26 is omitted for the purposes of simplification.

FIGS. 7 and 8 show a channel 27 inside the valve member 6 to convey flows of heating and cooling fluids for the valve member enabling it to change phase. Metal hoses 28 and 29 provide connections to the channel 27.

Thus, while the valve member is being moved towards its seat or seat member 26, the member is cooled and in its martensitic phase it takes up the shape imparted to it during "training" treatment of the valve member, in this case it contracts. Once the valve member is against its seat 26, it is heated and it expands and returns to its initial shape in the austenitic phase. Excellent sealing is thus obtained with the valve member 6 stressed against its seat 26. Cooling may be performed by a flow of cooling liquid or by expanding a gas (e.g. the Clifford-MacMahon cycle). Heating may be performed by a flow of hot gas or liquid.

Figure 6:
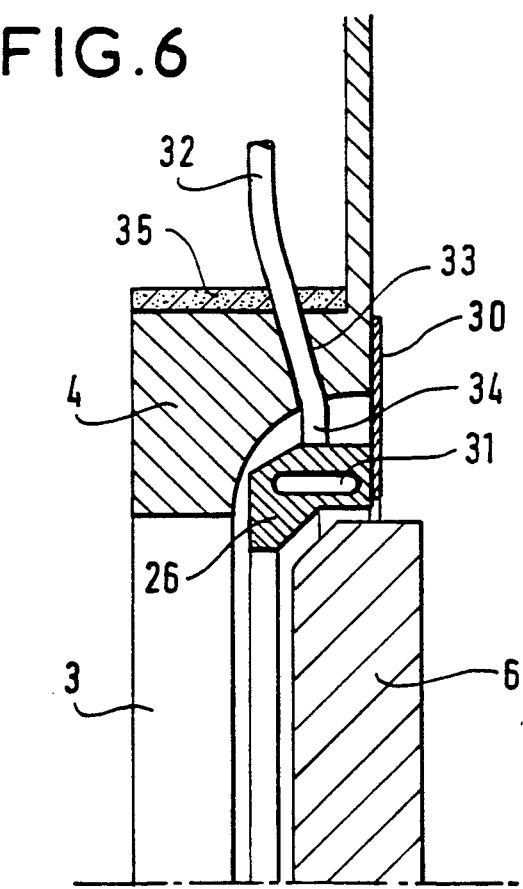
FIG. 6 shows the case where the seat is the member made of a shape memory alloy.

FIG. 6 shows an example in which it is the valve seat that is made of a shape memory metal alloy.

In this example, the seat 26 is thermally decoupled from the flange 4 by a leakproof ring 30 which connects the flange 4 mechanically to the seat 26. The seat 26 has a chamber 31 for fluid flow which is fed via a hose 32, a channel 33 passing in sealed manner through the flange 4, and a coupling 34.

The dimensions of the ring 30 are suitable for ensuring that while the valve is being closed it presents sufficient stiffness, and so that heat losses therethrough remain small during the short period of time that is required. The flange 4 may also be insulated from the outside by an insulating sleeve 35.

In this case, during cooling, seat shape memory metal alloy is in the martensitic phase, the seat expands to take up an expanded shape which was imparted thereto during the "training" of the piece. On heating the shape memory metal alloy seat to the austenitic phase, the seat contracts against the valve member 6 which has been brought home inside its seat.

To improve contact and sealing, the valve member 6 and/or the seat 26 may be coated with a soft metal such as silver, for example.

In the example described, the valve member is circular, however, this circular shape is not necessary, and similarly the invention may be applied to any type of valve.

It may be observed that the very principle of the invention ensures that sealing can only be reinforced if the valve is placed in an oven. Baking is frequent in ultra-vacuum applications.

In addition, because of the principle of the invention, it is always possible to open the valve even against a differential pressure in either direction.

By way of example, the following shape memory metal alloys may be used: to form one of the seat member 26 and the valve member 6 TiNi or CuZnAl. The change of stage temperatures can be adjusted at will: e.g. 100° C. in one direction and 70° C. in the opposite direction.

I claim:

1. In a valve comprising a valve body (1) having two axially aligned openings (2, 3) each fitted with a flange (4, 5) for connection to pipework, and a moving valve member (6) mounted on said valve body for movement into overlying position with one of said valve body openings for closing of one of the two openings (3), said one opening including a valve seat member (26) having a profile which corresponds to that of the valve member, said valve member (6) further including means (14, 8, 9, 24) for displacing the valve member towards its seat member to close the valve, the improvement wherein one of said members is made of a shape memory metal alloy having a reversible shape memory effect, said one member (6, 26) made of said shape memory metal alloy includes at least one channel (27, 31) and means for feeding fluids of preselected temperatures for changing the state of said member by heating or cooling said one member to thereby cause said one member (6, 26) made of said shape memory metal alloy to change state and to expand or contract to increase or decrease sealing between said valve member and said valve seat.

2. The valve as claimed in claim 1, wherein said shape memory metal alloy changes from austenitic phase to martensitic phase upon cooling and from martensitic phase to austenitic phase upon heating.

3. The valve as claimed in claim 2, wherein said one member of said shape memory metal alloy comprises an alloy of the group consisting of TiNi and CuZnAl.

4. The valve as claimed in claim 2, wherein said valve seat member is spaced from said valve body flange at said one valve body opening (3), a leak-proof ring (30) having one edge thereof fixed a second edge thereof fixed to said valve body flange (4) and to said valve seat member (26) and seals off a space between said valve seat member (26) and said flange (4), a chamber (31) is formed internally of said valve seat member (26), and said means for feeding fluids of preselected temperatures comprises a hose (32), passing through a channel (33) within said flange, and being coupled to said chamber (31) within said valve seat via a coupling (34) such that said valve seat member (26) is thermally decoupled from the flange (4) to facilitate change of state of the shape memory metal alloy of said valve seat member (26) to maximize the sealing effect between the valve seat member and the valve member responsive to feeding of a fluid of preselected temperature through said chamber (31) of said valve seat member (26).

* * * * *